J. H. Gleim.
Book for Book-Keeping.
Nº 72629        Patented Dec. 24, 1867

Sheet 1 — 2 sheets

Witnesses
H. Pauly
R. Siemon

Inventor
J. H. Gleim
By his Attys
M. Randolph & Co.

J. H. Gleim.
Book for Book-Keeping.
Nº 72629             Patented Dec. 24, 1867.

Sheet 2 — 2 Sheets

United States Patent Office.

JOHN H. GLEIM, OF ST. LOUIS, MISSOURI.

Letters Patent No. 72,629, dated December 24, 1867.

---

BOOK FOR BOOK-KEEPING.

---

The Schedule referred to in these Letters Patent and making part of the same.

---

TO ALL WHOM IT MAY CONCERN:

Be it known that I, JOHN H. GLEIM, of the city of St. Louis, in the county of St. Louis, and State of Missouri, have made certain new and useful Improvements in Books for Book-Keeping; and I do hereby declare that the following is a full and clear description thereof, reference being had to the accompanying drawings, and to the letters of reference marked thereon.

This invention finds a more special application in the method of book-keeping or account-keeping usual in banking business. I will therefore specially describe the said invention in the application to the accounts of a banking business.

The nature of the improvements here made relates to the use of alternate cash-books or journals for alternate days, respectively, and the said improvements relate to the form and arrangement of the columns, and entries in said cash-journal, in such manner that each day's business, and every transaction thereof, shall be clearly shown on the pages of said alternate journals.

To enable those competent to make and use my said improvement in books, I will describe the same more fully, referring to the accompanying drawings, of which—

Figure 1 shows a page of the cash-book or journal No. 1, and

Figure 2 shows similarly a page of the cash-book or journal No. 2.

In order to expedite the work of transferring names and amounts of each day's business, so as to be ready for each succeeding day's entries, I use the said alternate cash-journals, the pages hereof being marked respectively with odd and even figures, thus carrying odd pages in journal No. 1, and even figures in journal No. 2. In the column marked 1, and headed "names," will be placed the names of persons depositing money, or checking or withdrawing the same, as well as the accounts, such as "time deposits" or "discounts," and such others as must be debited and credited by cash, owing to the nature of the transaction. In the column marked 2, and headed "last balances," will be placed the amounts last occurring to the credit of each account in column 1. It will thus be seen that, for instance, on page 2 of journal 2, the accounts and amounts, as in columns 1 and 2, show the result of the operations or transactions done, as recorded on page 1 of journal 1, and similarly for other days. Moreover, all new transactions will be recorded on the proper day, in the proper journal, using the column 1 (in either journal) for names of new accounts, as aforesaid.

In order to more fully describe the business transactions, an entry specifying the nature thereof is made in column 3. As the left-hand page is usually the debit, and the right-hand page the credit side, all deposits will be entered on the left-hand page, (or half side,) and all checks or other disbursements (for which cash is to be credited) are entered on the right-hand page, it being remembered that the two pages together receive one and the same number, as shown in the drawings.

The amount of money or cash of each transaction is placed opposite the proper name in column 4, (this column being marked "cash.") In order that such of said transactions so recorded may be at once transferred or "posted" from the cash-books 1 and 2 to the general or individual ledgers, (which are here not otherwise described, as they form no part of this invention,) there is a column, 5, headed "L. fol.," meaning "ledger folio," and into this column is placed the number of the folio of the ledger to which the cash-book entry has been posted in the usual manner.

On the right and left-hand pages, respectively, I arrange a column marked 6, and headed, respectively, "Cr. balances," meaning "credit balances," and "Dr. balances," meaning "debit balances," the former showing the amount due by the bank to the depositor, or to any one account, and registering assets of capital and liabilities to depositors, and the debit balances showing the amount of overdraft by depositors, as well as losses by expenses.

In order, however, to facilitate the work of forming said balances of accounts in column 6, (from the figures in columns 2 and 4,) I have arranged (one set for each half page) the columns 7 and 8, and headed, respectively, "compilation" (or addition) and "subtraction." All operations of addition, such as adding to the previous balance the day's deposit, will be performed by the accountant in the compilation column, on the lines opposite to the depositor's name. Similarly all operations of subtraction necessitated by each day's transactions will be done in the column marked "subtraction," opposite the proper account. Thus it will be seen that any balance entered to debit or credit in column 6 can be scrutinized and reviewed from the figures contiguous to said balance in each or either column 7 or 8; and, by way of further safeguard against error, it will be seen that as the cash-journal becomes a full record of all cash transactions, the cash balance, as shown by the teller's cash-book, will balance the footings of Cr. and Dr. balances. Similarly the cash balances each day will balance the Cr. and Dr. cash columns, (numbered 3 in the figure.)

In order that the cash-journal may further indicate the changes in "ledger" or general accounts, I arrange the columns marked 9, and headed "ledger," which are used for numbers indicating transactions affecting ledger accounts, such as "capital stock," foreign bank accounts, and certificates of time deposits. A balance may be struck daily from the footings of the Dr. and Cr. ledger columns, and it will indicate the daily change of these ledger accounts, which may be easily checked by the change in cash account, discounts in bank, certificates of deposit, &c., thereby again preventing error.

It appears, then, that by my arrangement of the said alternate cash-books or journals, the work of keeping accounts is much reduced; that thereby a clear and concise statement of all daily transactions of business is furnished, the same including moneys drawn out and deposited on individual account, as well as expense and profit items and transactions; that the said arrangement furnishes a daily check on the teller's cash, on accounts of depositors and correspondents; and lastly, that it shows forth a statement of ledger accounts, and furnishes opportunities to correct and check trial-balances of ledger accounts. Thus the usual day-book, which is used in addition to the cash-book, becomes needless, and also the usual "balance-book," containing daily balances of depositors and bank accounts. And added to the general advantages of showing on one page all transactions, the arrangement of columns 7 and 8 shows the accountant's work in forming every balance, the entire detail of the keeping of each and every account being thus held to inspection.

Having thus fully described my invention, what I claim, is—

1. The combination of the alternate cash-journals 1 and 2, paged respectively with odd and even numbers, substantially as and for the purposes set forth.

2. The combination of the balance-column 6 with columns 1, 2, and 3, substantially as and for the purposes set forth.

3. The combination and arrangement of columns 7 and 8 with columns 1 and 6, substantially as and for the purpose set forth.

4. The combination and arrangement of the ledger-column 9 with columns 1 and 3, substantially as and for the purposes set forth.

In testimony of which invention, I hereunto set my hand, in presence of—

J. H. GLEIM.

Witnesses:
  GEO. P. HERTHEL, Jr.,
  M. RANDOLPH.